(12) United States Patent
Foster

(10) Patent No.: US 7,127,420 B1
(45) Date of Patent: *Oct. 24, 2006

(54) DATA PROCESSING SYSTEM FOR COMPLEX PRICING AND TRANSACTIONAL ANALYSIS

(75) Inventor: Robert A. Foster, Jersey City, NJ (US)

(73) Assignee: Financial Systems Technology (Intellectual Property) Pty. Ltd., Malvern (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/535,573

(22) Filed: Mar. 27, 2000

Related U.S. Application Data

(63) Continuation of application No. 08/904,716, filed on Aug. 1, 1997, now Pat. No. 6,052,672.

(51) Int. Cl.
*G06Q 40/00* (2006.01)
(52) U.S. Cl. .................. 705/35; 705/30; 705/34; 707/1; 707/2; 707/3; 707/4; 707/104.1
(58) Field of Classification Search .............. 705/30, 705/34–35, 4, 21, 9, 26–27, 38, 39–42, 10, 705/36, 28; 707/1–4, 103–104.1; 717/10; *G06F 17/60*
See application file for complete search history.

(56) References Cited

U.S. PATENT DOCUMENTS

| | | | | |
|---|---|---|---|---|
| 5,247,575 A | * | 9/1993 | Sprague et al. ............... | 705/53 |
| 5,262,942 A | * | 11/1993 | Earle ............................ | 705/37 |
| 5,532,920 A | * | 7/1996 | Hartrick et al. .............. | 715/500 |
| 5,550,734 A | | 8/1996 | Tarter et al. .................... | 705/2 |
| 5,559,313 A | | 9/1996 | Claus et al. | |
| 5,604,899 A | | 2/1997 | Doktor .......................... | 707/3 |
| 5,613,012 A | | 3/1997 | Hoffman et al. ............. | 382/115 |
| 5,617,567 A | | 4/1997 | Doktor .......................... | 707/2 |
| 5,630,127 A | | 5/1997 | Moore et al. ............... | 707/104 |
| 5,636,117 A | | 6/1997 | Rothstein ..................... | 705/4 |

(Continued)

FOREIGN PATENT DOCUMENTS

EP     0332707     *  9/1989

(Continued)

OTHER PUBLICATIONS

From DialogClassic Web(TM) file 13, New data: cut costs 60% with employee selfOservice, Payroll Manager's Report, No. 1-1 p. 1, 14-15, published Jan. 2001.*

(Continued)

*Primary Examiner*—Cuong Nguyen
(74) *Attorney, Agent, or Firm*—Edward C. Kwok; MacPherson Kwok Chen & Heid LLP

(57) ABSTRACT

The present invention provides methods and systems for defining financial transaction components; defining mapping rules for taking individual financial transactions and breaking them down into their components, such as production services, billing services and settlement services. A data processing system in accordance with one embodiment of the present invention, creates a transaction instance corresponding to a financial transaction, creates a production service instance linked to the transaction instance by a first relation instance, and creates a billing service instance linked to the production service instance by a second relation instance. The data processing system, may also create other production service instances linked to the transaction instance using other relation instances, as well as, other billing service instances linked to the production service instances.

40 Claims, 6 Drawing Sheets

Microfiche Appendix Included
(4 Microfiche, 321 Pages)

U.S. PATENT DOCUMENTS

| | | | | |
|---|---|---|---|---|
| 5,652,882 | A | | 7/1997 | Doktor .................... 707/201 |
| 5,675,779 | A | | 10/1997 | Doktor ....................... 707/4 |
| 5,682,482 | A | | 10/1997 | Burt et al. ................. 705/42 |
| 5,704,044 | A | | 12/1997 | Tarter et al. ................ 705/4 |
| 5,742,775 | A | | 4/1998 | King ........................ 705/38 |
| 5,826,259 | A | | 10/1998 | Doktor ....................... 707/4 |
| 5,838,812 | A | | 11/1998 | Pare, Jr. et al. .......... 382/115 |
| 5,852,812 | A | | 12/1998 | Reeder ...................... 705/39 |
| 6,236,971 | B1 | * | 5/2001 | Stefik et al. ................ 705/1 |
| 6,324,522 | B1 | * | 11/2001 | Peterson et al. ............ 705/28 |
| 6,578,014 | B1 | * | 6/2003 | Murcko, Jr. ................ 705/26 |
| 6,598,029 | B1 | * | 7/2003 | Johnson et al. ............. 705/37 |
| 2002/0026368 | A1 | * | 2/2002 | Carter, III ................. 705/20 |
| 2004/0199508 | A1 | * | 10/2004 | Shaffer et al. ............... 707/6 |

FOREIGN PATENT DOCUMENTS

| | | | |
|---|---|---|---|
| GB | 2236604 | * | 4/1991 |
| WO | WO 920022 | * | 11/1992 |

OTHER PUBLICATIONS

Freeman, An idexing and price movement model for managing pension funds, Healthcare Financial Management, v48n 10, pp. 48-50, published on Oct. 1994.*

From DialogClassic Web(TM) file 16, Trade on better terms, The Economist Journal, p. 76, published on Mar. 27, 1992.*

Selva, City: Nationwide pledge to refund rivals' fees, Daily Telegraph London, p. 31, published on Feb. 29, 2000.*

Unknown, Microsoft creates yet another company, Washingtonpost Newsweek Interactive, Jun. 26, 1997 (from http://www.findarticles.com, 2 pages).*

Mariam Fergusson, Revenue collection via the Internet: transaction cost components, unknown date (from http://www.answers.com, 11 pages).*

Unknown, Microsoft and First Data form new company to enable consumers to receive and pay bills over the Internet, Microsoft Corporation Jun. 26, 1997 (from http://www.microsoft.com/prresspass/press/1997/Jun97/, 3 pages).*

Unknown, Versatility introduces version 2.2 of its flagship Telesales/Telemarketing application, Business Wire, Jan. 28, 1997 (4 pages).*

Unknown, Billtrust and DSMi software form strategic alliance to offer outsourced billing service for wholesale distributors, from http://www.billllltrust.com/, Jul. 18, 2005 (8 p0ages).*

Unknown, SAP Business One: Bank Transactions, from http://www.sap.com/search/lp/bank_transactions.epx? . . . printed on Oct. 26, 2005 (1 page).*

Unknown, ING Bank chooss SunTec platform for next generation operational support and billing, from http://www.sunteconline.com/news_ing_02.htm, printed on Oct. 25, 2005.*

Unknown, Billing Information—Billing and Receivable Tracking (BART)—V6.0, from http://www.qwest.com/wholesale/clecs/bart.html, printed on Oct. 25, 2005 (3 pages).*

Unknown author, Software packages assist diverse needs of bond portfolio managers, Wall Street Computer Review, Jun. 1985, pp. 61-65.*

Howcroft, "Contemporary issues in UK bank delivery systems", Inter. Jour. Of Service Industry Management, vol. 3, No. 1, pp. 39-56, ISBN 0956-4233, 1992.

"Teller fees translate to torrid ATM activity", Debit Card News, vol. 1, No. 4, p. 1+, Jun. 3, 1995.

"Banks Freeze Debit Fees To Shorten Teller Lines", Debit Card News, vol. 1, No. 1, p.1+, Jun. 15, 1995.

"The Smart Card's Chief Advocate", Credit Card Management, vol. 10, No. 1, p. 26+, ISBN: 0896-9329, 1992.

* cited by examiner

| TRANSACTION INSTANCE IDENTIFIER 191 | COUNT OF THE # OF PRODUCTION SERVICE INSTANCE OF PRODUCTION SERVICE TYPE 130 192 | COUNT OF THE # OF PRODUCTION SERVICE INSTANCE OF PRODUCTION SERVICE TYPE 150 193 | COUNT OF THE # OF PRODUCTION SERVICE INSTANCE OF PRODUCTION SERVICE TYPE 170 194 |
|---|---|---|---|
| 114 | 1 | 1 | 1 |
| 113 | 1 | 2 | 1 |
| | | | |
| | | | |
FIG. 1(d)
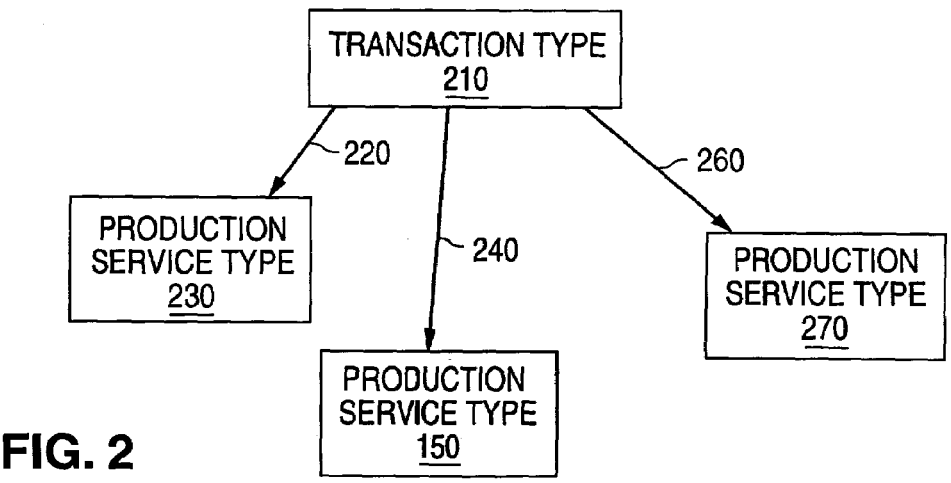
FIG. 2
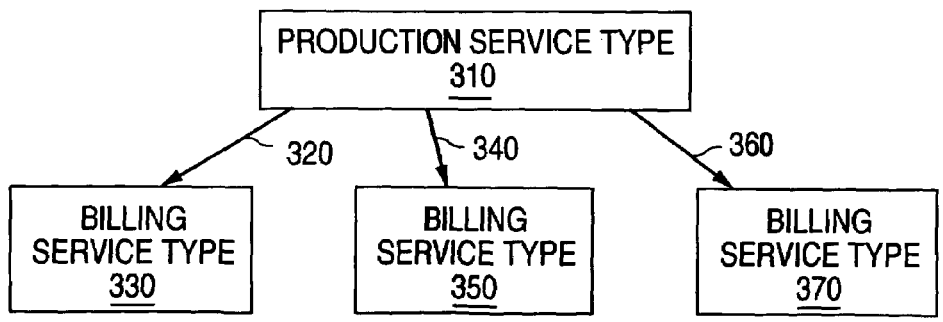
FIG. 3(a)

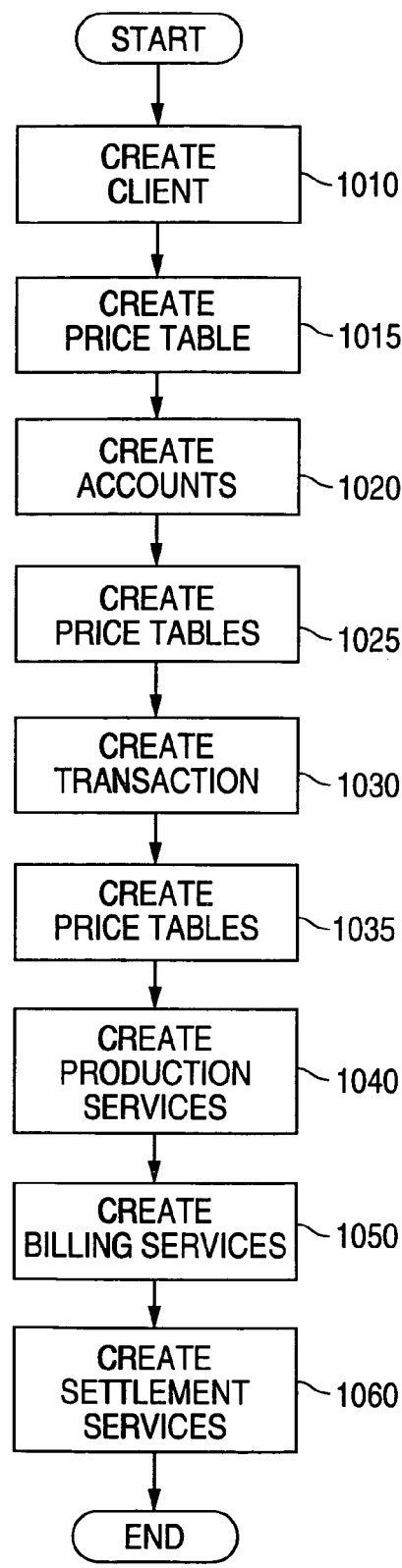
FIG. 10
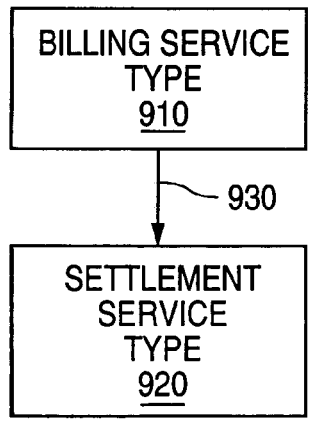
FIG. 7(c)
FIG. 9

DATA PROCESSING SYSTEM FOR COMPLEX PRICING AND TRANSACTIONAL ANALYSIS

This application is a continuation of 08/904,716, filed Aug. 1, 1997, now U.S. Pat. No. 6,052,672.

CROSS REFERENCE TO MICROFICHE APPENDIX

Appendix A, which is a part of the present disclosure, is a microfiche appendix consisting of four (4) sheets of microfiche having a total of 321 frames. Microfiche Appendix A is a listing of Software code for embodiments of components of this invention, which are described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to data processing systems and, in particular, to pricing and analysis systems for complex transactions.

2. Discussion of Related Art

Financial services companies (FSCs), such as retail banks, wholesale banks, corporate banks and investment banks, provide a variety of financial services which are bundled together and offered to clients as financial products. Checking accounts, cash management accounts, mortgages, funds transfers and lockboxes are all examples of financial products. A financial transaction takes place when a client uses a financial service and when a FSC provides a financial service.

In a competitive market, FSCs have to balance their need to grow market share by having competitive (i.e. low) fee arrangements, against the need to run their businesses profitably (i.e. with high margins). Managing this balancing act has been a challenge for FSCs because the traditional practices used by FSCs provide insufficient detail about how individual financial transactions affect their profitability. With insufficient details FSCs are not able to provide consistent and reconcilable measures for different views of costs and fees which may be desired. FSCs would desire views such as a client view because the business is conducted by clients, a market segment view because the business is measured by market segments, and a financial product view because the business is organized by financial products.

Costs can vary greatly based on the types of financial transactions being processed and characteristics of each individual financial transaction. For example, in funds transfers, costs can vary based on the participant (corporate, retail, correspondent, broker/dealer); the instruction (free form, semi repetitive, pre programmed); the timing (start of day, end of day, urgent, late); the instrument (cash, checks, payment orders, electronic instruction capture devices); the delivery system (SWIFT); the clearing system; settlement itself; credit/risk (daylight overdraft limits, balances, secured/unsecured debit caps); applicable transaction taxes; investigations; and compensations. Failure by a FSC to understand or accurately measure the cost of processing each individual financial transaction makes it very difficult for the FSC to manage the impact of their pricing arrangements on the profitability of their financial services, financial products and financial transactions.

Fees can also vary greatly based on the types of financial transactions being processed and characteristics of each individual financial transaction. For example, in funds transfers, fee arrangements can be based on time of submission; a specified execution time; the window of time between submission and execution; transaction value; pre-assigned payment slots; or a combination of these factors. Furthermore, fee arrangements may change over time both in value and structure in response to competitive situations.

To manage the profitability outcomes of financial services, financial products and financial transactions, a FSC needs to understand and accurately measure fees earned based on each individual financial transaction processed. Furthermore, FSCs wish to manage fee arrangements and special deals based on the profit margins achievable.

However, understanding and accurately measuring the impact of costs and fee arrangements on the profitability of financial services, financial products and financial transactions is too complex to be handled in an ad hoc manner. Therefore, a systematic method to track all of the components of costs and fees each time a financial transaction is processed is needed. Furthermore, the system should be able to measure profitability in a flexible manner and to measure the impact of any changes from as many views as the FSC's business requires, e.g., by financial product, by financial service, by financial transaction, by client account, by client, by group of clients, by market segment, and by region, by strategic business unit.

SUMMARY

Accordingly, the present invention includes methods and systems for defining financial transaction components; defining mapping rules for taking individual financial transactions; and breaking financial transactions into components, such as production services, billing services and settlement services. A FSC, using embodiments of the present invention, can track components, assign costs to components, assign fees to components, measure profitability of financial transactions from multiple views, and measure the impact of changes to costs and fees on profitability of financial transactions from multiple views.

Specifically, a data processing system in accordance with one embodiment of the present invention, creates a transaction instance corresponding to a financial transaction, creates a production service instance linked to the transaction instance by a first relation instance, and creates a billing service instance linked to the production service instance by a second relation instance. The data processing system, may also create other production service instances linked to the transaction instance using other relation instances, as well as, other billing service instances linked to the production service instances.

A data processing system in accordance with another embodiment of the invention, includes account instances which are linked to transaction instances. The account instances may also be related to client instances. Furthermore, the data processing system may include price table instances related to an entity instance, such as a transaction instance, an account instance, a client instance, or a department instance. The price table instances contain prices for various billing service instances.

BRIEF DESCRIPTION OF THE DRAWINGS

FIG. 1(d) illustrates a table used to store information.

FIG. 2 illustrates mapping rules for a transaction type.

FIG. 3(a) illustrates mapping rules for a production service type.

FIG. 7(c) is one embodiment of a price table instance.

FIG. 9 illustrates mapping rules for a billing service type.

FIG. 10 is a flowchart for the data processing system.

DETAILED DESCRIPTION

According to the principles of this invention, certain limitations imposed by conventional pricing systems have been overcome. The present invention provides a data processing system which breaks down a client transaction into various components provided by the FSC. Conversion to components is not a simple task because each transaction requires analysis at an "atomic level" of detail which has not been used before. This atomic level of detail allows a FSC to determine the cost of each individual financial transaction, in component parts, which in turn, enables the FSC to determine an appropriate fee which should be charged so that the FSC can make an informed choice to balance the need for low fees against the need for high margins, resulting in better managed profitability outcomes.

By using flexible mapping rules between transactions and services, the present invention allows FSCs to easily monitor the costs of transactions involving multiple services by client, by financial product, by market segment or by any other view which a FSC deems necessary. Thus, the same principles can be applied to easily monitor the billing of clients when fees are used instead of costs. The same principles can be applied to easily monitor the profitability for processing transactions when both costs and fees are included.

A suitable database system for implementing a data processing system in accordance with the present invention is described in U.S. Pat. No. 5,604,899 entitled "DATA RELATIONSHIPS PROCESSOR WITH UNLIMITED EXPANSION CAPABILITY," which is hereby incorporated by reference in its entirety. However, other database systems can be used to implement a data processing system using the principles described herein. For clarity, the language of U.S. Pat. No. 5,604,899 is used herein. Thus various elements of the pricing system are described as entity types while other elements are described as relation types. Occurrences of an entity type are described as entity instances while occurrences of a relation type are described as relation instances.

Figure 1A:
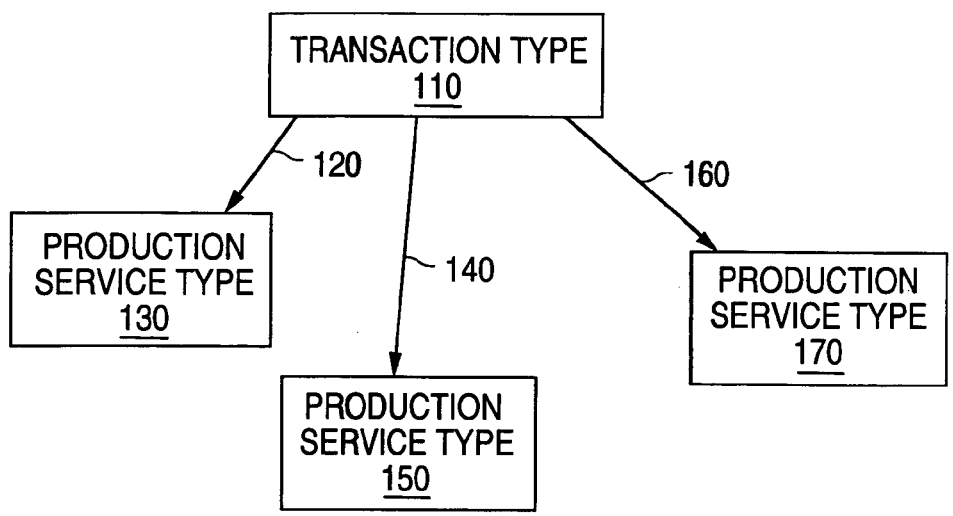
FIG. 1(a) illustrates mapping rules for a transaction type.

FIG. 1(a), illustrates the breakdown of transaction type into production service types in accordance with one embodiment of the present invention. Generally, financial services are bundled together and offered to clients as financial products. Checking accounts, cash management accounts, mortgages, funds transfers and lockboxes are all examples of financial products. A financial transaction takes place when a client uses a financial service and when a FSC provides a financial service. Each transaction is categorized into a transaction type, which is an entity type as used in U.S. Pat. No. 5,604,899. Thus, the services provided by the FSC can be priced on the transaction level. By grouping transactions together, the financial services provided can also be priced at the account level, at the client level or at any other level which can be related to transactions. By breaking the transaction down into components such as production services the financial services provided to the client can be priced based on the production services which were involved in processing each transaction.

Production services are the individual actions that the FSC must perform or that the FSC wishes to count to process the transaction completely. Some production services may involve a cost to the FSC; some production services may involve a fee which can be charged and; some production services may involve actions which the FSC simply wishes to count. For example, in funds transfers, production services can be based on the participant (corporate, retail, correspondent, broker/dealer); the instruction (free form, semi repetitive, pre programmed); the timing (start of day, end of day, urgent, late); the instrument (cash, checks, payment orders, electronic instruction capture devices); the delivery system (SWIFT); the clearing system; settlement itself; credit/risk (daylight overdraft limits, balances, secured/unsecured debit caps); applicable transaction taxes; or investigations and compensations. Each production services is categorized into at least one production service type, which is also an entity type.

Specifically in FIG. 1(a), a transaction type 110, is mapped to a plurality of production service types, each of the mapping rules illustrated by arrows are relation instance types. Thus, transaction type 110 is mapped to production service type 130 by a relation type 120, production service type 150 by a relation type 140, and production service type 170 by relation type 160. On average, a payment transaction can be mapped to 11 or more production service types. Relation types 120, 140, and 160 may use cardinality properties of one-to-one, one-to-many, many-to-one, or many-to-many mappings as described in U.S. Pat. No. 5,604,899. For example, 2 or more transaction instances of the same transaction type could be mapped to a single production instance or 2 or more transaction instances of different transaction types could be mapped to a single production instance.

Figure 1B:
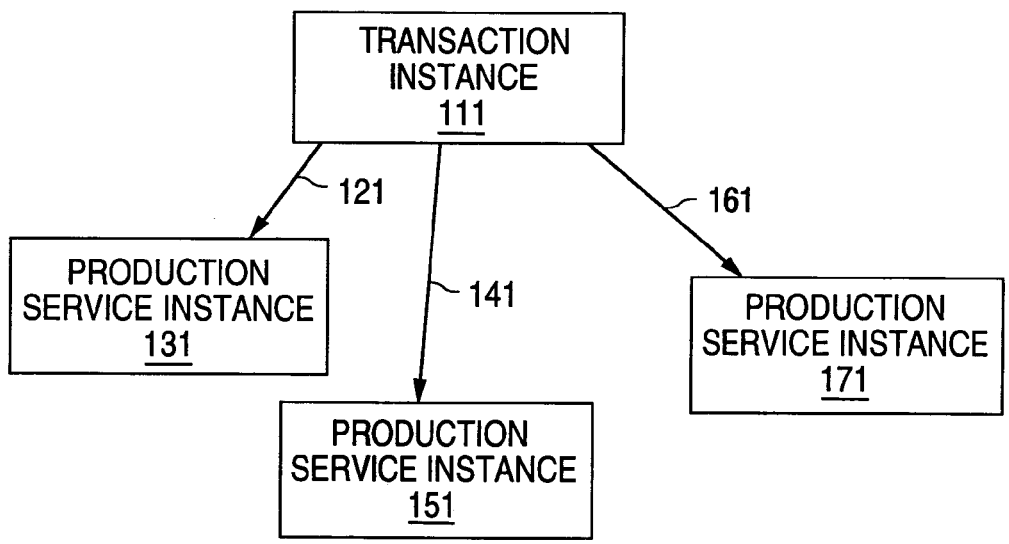
FIG. 1(b) illustrates the mapping of a transaction instance into production service instances.

When a transaction of transaction type 110 occurs the data processing systems creates relations instances and production services as dictated by the mapping rules shown in FIG. 1(a) To distinguish the actual transaction performed by the FSC from the representation of the transaction in the data processing system, the representation of a transaction is called a transaction instance. Similarly, a production service instance is the representation of a specific production service performed by the FSC. Thus, as shown in FIG. 1(b), the data processing system maps transaction instance 111 of transaction type 110 to a production service instance 131 of production service type 130 through a relation instance 121 of relation type 120. Similarly, the data processing system maps transaction instance 111 of transaction type 110 to production service instance 151 of production service type 150 through relation instance 141 of relation type 140 and production service instance 171 of production service type 170 through relation instance 161 of relation type 160. Transaction instances of transaction type 110 do not necessarily include production service instances of production service type 130, production service type 150, and production service type 170. However, some relation types can include a mandatory property as described in U.S. Pat. No. 5,604,899, to mandate the presence of a relation instance of that relation type and to mandate the presence of a production service instance of a particular production service type.

If the data processing system of U.S. Pat. No. 5,604,899 is used, transaction instance 111, production service instance 131, production service instance 151, and production service instance 171, which are all entity instances, would be stored in one or more entity instance tables. Conversely, relation instance 121, relation instance 141, and relation instance 161 would be stored in one or more relation instance tables.

Mapping rules for transaction types may also depend on the value of the transaction. For example, the value of a transaction may determine whether an overdraft approval is required to process the transaction. If an overdraft approval is required, an overdraft production service is included. Furthermore, overdraft approval for a small amount of money may involve different production services than one for a large amount of money. Thus if production service type 170 represents an overdraft production some transaction instances of transaction type 110 need not include a production service instance of production service type 170.

Figure 1C:
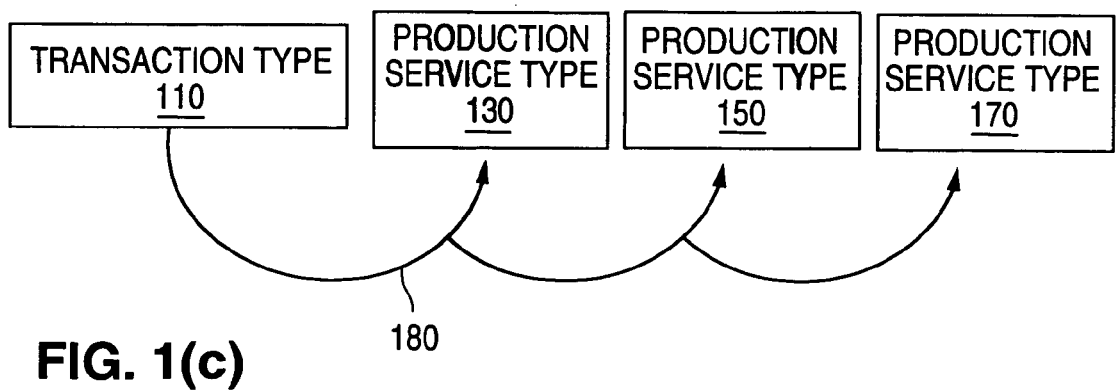
FIG. 1(c) illustrates mapping rules for a transaction type.

In embodiments of the data processing system using multi-tailed relations such as those described in U.S. Pat. No. 5,604,899, a single relation type can map one entity type to one of several entity types. Thus as shown in FIG. 1(*c*), the mapping rules can use a relation type 180 to map transaction instances of transaction type 110 to a production service instance of production service type 130, or production service type 150, or production service type 170. Upon receiving a transaction of transaction type 110, a data processing system using the mapping rules illustrated by FIG. 1(*c*) would create a transaction instance of transaction type 110 and maps the transaction instance to a production service instance of production service type 130, a production service instance of production service type 150, or a production service instance of production type 170 through a relation instance of relation type 180.

FIG. 1(*d*) shows an alternate way to store information about transaction instances of transaction type 110. A table 190 having multiple columns and rows is used to store entity instance information. Each row of table 190, for example row 195 or row 196, contains information for one transaction instance. Column 191 contains a transaction instance identifier. Thus row 195 contains information about transaction instance 114 while row 196 contains information about transaction instance 113. Column 192 contains a count of the number of production service instances of a particular production service type which have been mapped to the transaction instance in the row. Thus transaction instance 114 has been mapped to 1 production service instance of the production service type tracked by column 192. For example, column 192 could track production service type 130 (FIG. 1(*c*)), column 193 could track production service type 150; and column 194 could track production service type 170. Table 190 is suited for cases when only the number of production services of each production type used is needed. If specific information of each transaction is unnecessary, column 191 can contain a transaction type identifier so that all transactions of a particular transaction type are tracked in one row. When table 190 is used, the production service instances represented by columns 192, 193 and 194 are implicitly related to the transaction instances represented by column 191 as described in U.S. Pat. No. 5,604,899.

FIG. 2, illustrates the mapping rules for transaction instances of a second transaction type into production service instances of different production service types. In FIG. 2, a transaction type 210 is mapped to a production service type 230 through a relation type 220, to a production service type 150 through a relation type 240 and a production service type 270 through a relation type 260. Thus different transaction types can share production service types, since both transaction type 210 and transaction type 110 (FIG. 1(*a*)) are mapped to production service type 150. For example, whether a client uses an Automated Teller Machine (ATM) owned by the FSC or an ATM leased by the FSC one of the production services required by an ATM withdrawal transaction may involve a production service type which represents the cost of storing cash in the ATM.

Figure 3B:
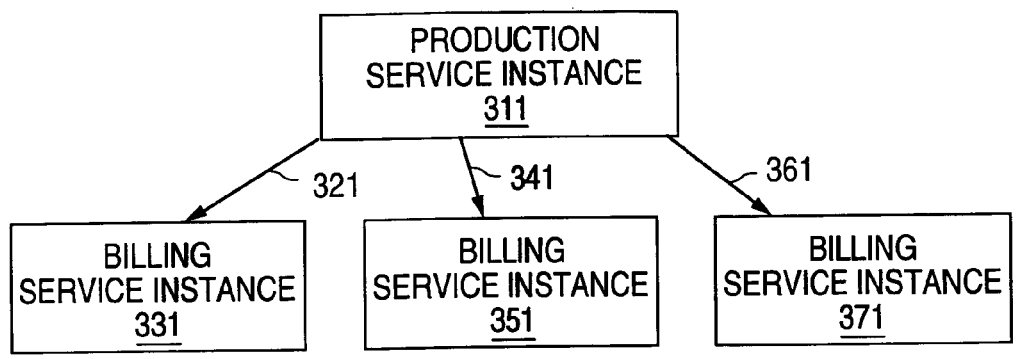
FIG. 3(b) illustrates the mapping of a production service instance into billing service instances.

Production services are further mapped into billing services. Typically, billing services represent activities which involve costs to the FSC and or activities which involve fees to be charged. One or more billing service may be associated with one or more production service. FIGS. 3(*a*), 3(*b*), 4, 5, and 6 illustrate some possible mapping rules from production service types to billing service types.

FIG. 3(*a*) illustrates a typical mapping of a single production service type 310 to a plurality of billing service types. Specifically, production service type 310 is mapped to billing service type 330 by relation type 320, to billing service type 350 by relation type 340, and to billing service type 370 by production service type 360. Thus as shown in FIG. 3(*b*) when a production service instance 311 of production type 310 is created, the data processing system creates a billing service instance 331 of billing service type 330 related to the production service instance 311 by a relation instance 321 of relation type 320, a billing service instance 351 of billing service type 350 related to production service instance 311 by a relation instance 341 of relation type 340, and a billing service instance 371 of billing service type 370 related to production service instance 311 by a relation instance 361 of relation type 360.

Figure 4:
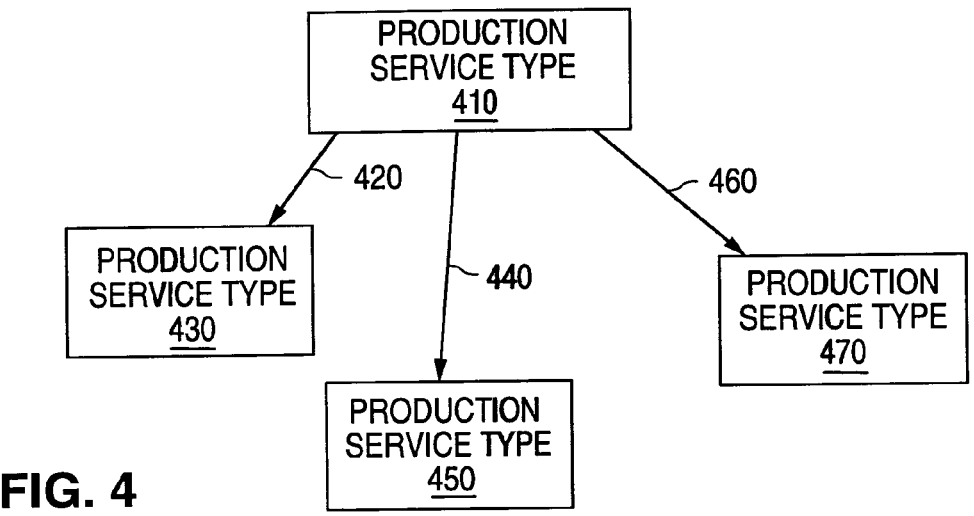
FIG. 4 illustrates a production service type mapped to other production service types.

Some embodiments of the data processing system allow mapping of production services to other production services. FIG. 4 illustrates the mapping rules for a production service type 410. Specifically, production service type 410 is mapped to a production service type 430 by relation type 420, to production service type 450 by relation type 440, and to production service type 470 by relation type 460. When a production service instance of production type 410 is created, the data processing system creates production service instances of production service types 430, 450, and 470 linked to the production service instance of production service type 410 by relation instances of relation types 420, 440, and 460, respectively.

Figure 5:
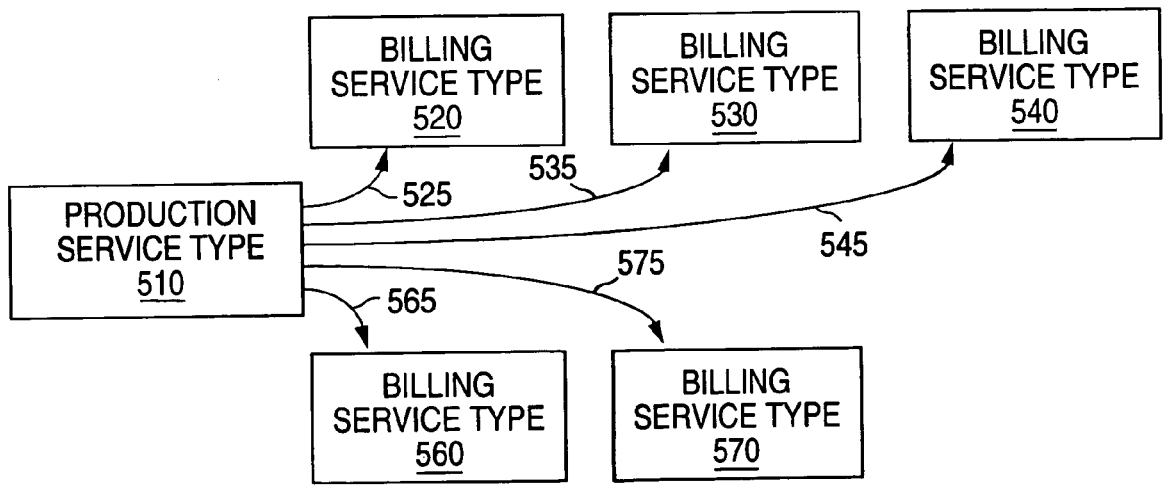
FIG. 5 illustrates mapping rules for a production service type.

A production service may at times be mapped to different sets of billing services. For example, a FSC formed by the merger of two FSC may have had different contracts with the same client. The client may insist on getting the best price the client would have received from either of the premerged FSCs. Furthermore, using multiple mapping rules for production service types facilitates having different views as described above. An example mapping rule for a production service type 510 is given in FIG. 5. Production service type 510 is mapped to billing service type 520 by relation type 525, billing service type 530 by relation type 535, and billing service type 540 by relation type 545. Production service type 510 is separately mapped to billing service type 560 by relation type 565 and billing service type 570 by relation type 575. Thus when a production service instance of production service type 510 is created, the data processing system creates a relation instance of relation type 525 which maps the production service instance to a billing service instance of billing service type 520, a relation instance of relation type 535 which maps the production service instance to a billing service instance of billing service type 530, and a relation instance of relation type 545 which maps the production service instance to a billing service instance of billing service type 540. In addition, the data processing system creates a relation instance of relation instance type 565 which maps the production service instance to a billing service instance of billing service type 560 and a relation instance of relation type 575 which maps the production service instance to a billing service instance of billing service type 570.

Figure 6:
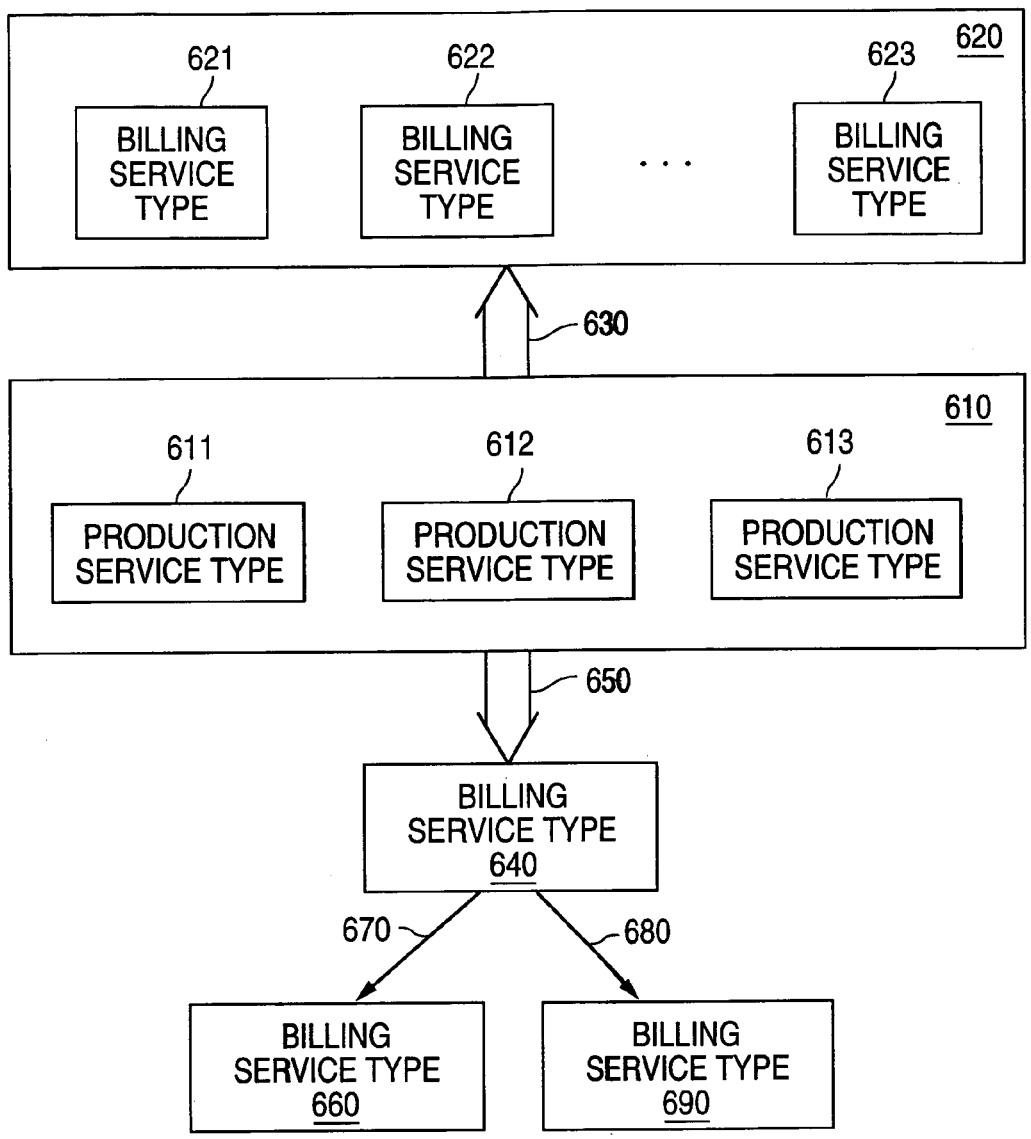
FIG. 6 illustrates mapping rules for a plurality of production service types.

In some FSCs, the cost of multiple production services are calculated together. Thus in some embodiments of the data processing system, multiple production service instances are mapped to one or more billing service instances. FIG. 6, illustrates a mapping rule for a set of production service types 610 to a set of billing services types 620 by relation type 630. Also as shown in FIG. 6, a set of production service types 610 is also mapped to billing services type 640 by relation type 650. Furthermore, FIG. 6 illustrates that billing service types can be mapped to additional billing service types. Thus billing service type 640 is mapped to billing service type 660 by relation type 670 and to billing service type 690 by relation type 680.

Thus, if a transaction instance is mapped to a group of production service instances which includes a production service instance of production service type 611, a production service instance of production service type 612, and a production service instance of production service type 613, the data processing system creates a billing service instance of billing service type 621, a billing service instance of billing service type 622, and a billing service instance of billing service type 623 related to the production service instances by a relation instance of relation type 630. In addition the data processing system creates a billing service instance of billing service type 640 related to the set of production service instances by a relation instance of relation type 650. Furthermore, the data processing system creates a billing service instance of billing service type 660 and a billing service instance of billing service type 690 related to the billing service instance of billing service type 640 by a relation instance of relation type 670 and a relation instance of relation type 680, respectively.

To effectively analyze the transactions, production services and billing services the data processing system also relates the transaction instances and therefore the production service instances and billing service instances, which are related to the transaction instances as described above, to clients, accounts, products, and/or market segments. Initially, client instances are created in the data process system to represent clients. Similarly, account instances are created to represent accounts at the FSC. Client instances and account instances would be entity instances in the database system of U.S. Pat. No. 5,604,899.

Figure 7A:
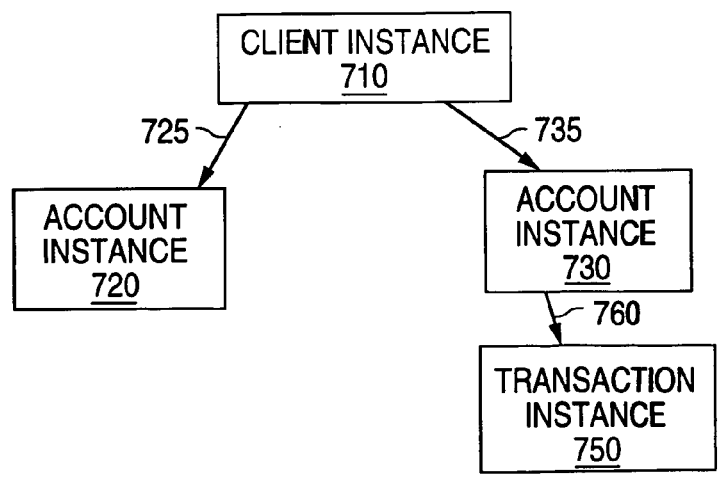
FIG. 7(a) illustrates management of clients and client accounts.
Figure 7B:
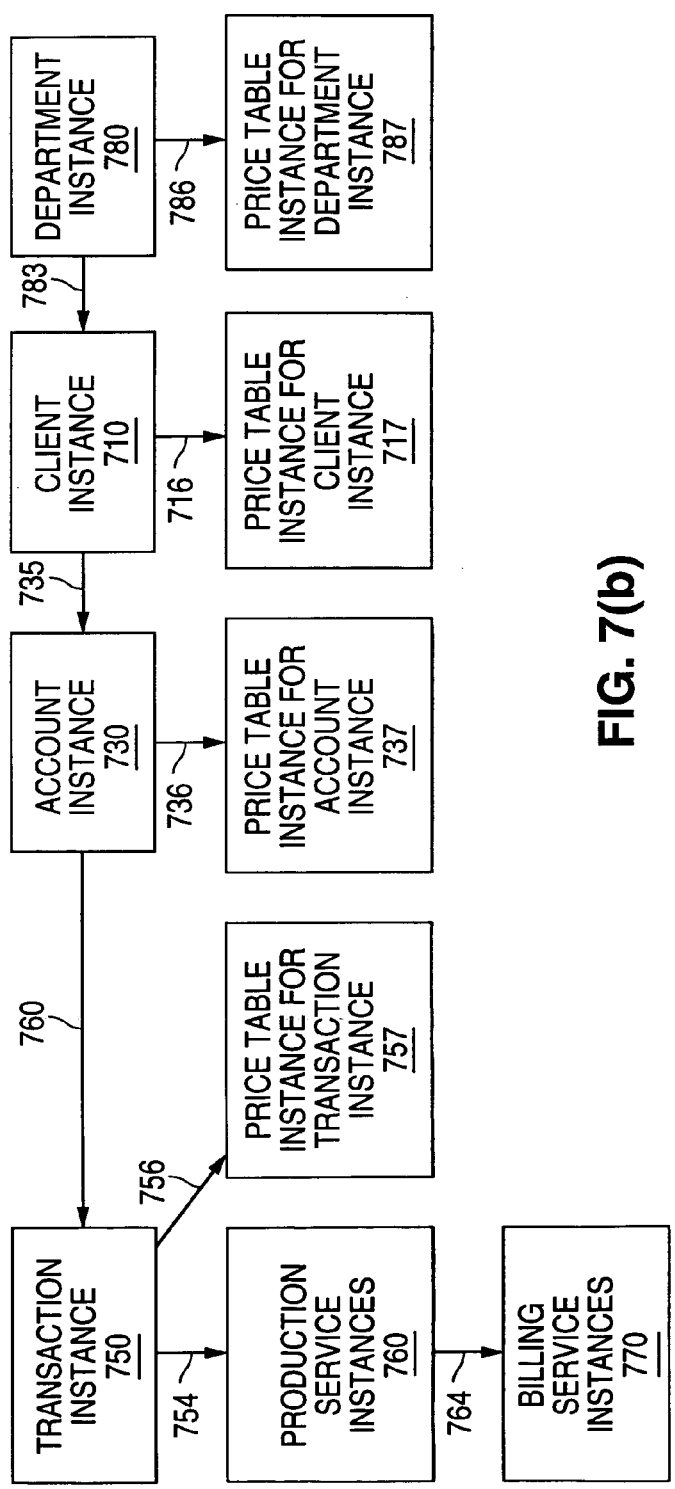
FIG. 7(b) illustrates use of price table instances to price billing services.

FIG. 7(*a*) illustrates a typical data structure for tracking a client. In FIG. 7(*a*) a client is represented in the data processing system by a client instance 710. Some or all of the client's accounts represented by account instances such as account instance 720 and account instance 730, which are related to client instance 710 by relation instance 725 and relation instance 735, respectively. When the client conducts a transaction with the FSC, an entity instance for the transaction, for example transaction instance 750, of the appropriate transaction type is created. Transaction instance 750 is mapped to the appropriate client account, in this case account instance 730, by a relation instance 760. The data processing system also creates the appropriate production service instances and billing service instances as described above. If the FSC only needs to track production service instances used at the account or client level, the database system can store information in a table such as table 190 (FIG. 1(*d*)). In such a situation, column 191 would contain an account instance identifier or a client instance identifier.

The actual cost and or the actual fee for a billing service type is recorded in a price table instance which is usually related to the department managing the product, the client, the account, or any other entity instance to which the transaction instance can be related either directly or indirectly. FIG. 7(*b*) illustrates the use of price table instances. Transaction instance 750 is mapped to one or more production service instances 760 through one or more relation instances 754 as described above. One or more production services instances 760 is mapped to one or more billing service instances 770 through one or more relation instances 764 as described above. Each billing service type to which transaction instance 750 is mapped is related to one or more price table instances via relation instances between the price table instances and the transaction instances, the account instances of the transaction instances, the client instances of the account instances, or the department instances assigned to managing the client. Thus as illustrated in FIG. 7(*b*), client instance 710 is mapped to department instance 780 through relation instance 783. Transaction instance 750 may be related to a price table instance 757 through relation instance 756. Similarly, account instance 730 may be related to a price table instance 737 through a relation 736; client instance 710 may be related to a price table instance 717 through relation instance 716; and department instance 780 may be related to a price table instance 787 through a relation instance 786. Each of the price tables is optional depending on whether the FSC has specific pricing rules for the transaction, account, client or department. Furthermore, each of the price tables may be shared by other transactions, accounts, or clients. Thus, for example, price table instance 737 may be related to other account instances. The data pricing system typically includes a global price table instance which can be used if no other price table instances is related to a billing service instance. Specifically, one embodiment of the pricing system includes a FSC entity instance representing the FSC itself. The FSC entity instance is related to the global price table via a mandatory relation instance. The FSC entity instance is also related to each of the department instances.

Whether a transaction, account, or client is related to a price table instance depends on whether the FSC and the client have negotiated a specific fee structure for the transaction, account or client. For example, if the FSC and the client have negotiated special prices to perform a specific transaction, the transaction instance representing that transaction is related to a price table instance representing the negotiated prices. Similarly, a price table instance is used with an account instance or client instance, if the FSC has a specific price structure for the account or client, respectively. The same principles can be applied to provide custom pricing based on billing service type and billing service type within account instances. As explained above since price tables may be shared by multiple transactions, accounts, or clients; a specific transaction instance, account instance, or client instance may be related to more than one price table instance when custom pricing is needed. Thus, for example, account instance 730 may also be related to a custom price table by a relation instance of a "custom rules" relation type. The custom price table contains pricing information which supersedes pricing information in price table instance 737.

Compound queries can be used to determine the appropriate price table instance as described in U.S. Pat. No. 5,604,899. Thus, if the FSC wishes to determine the cost of servicing the client represented by client instance 710, the FSC can query the data processing system to find all the billing service instances, including billing service instances 770, used by the client. The data processing system begins by finding account instances, such as account instance 730 and account instance 720 (FIG. 7(a)), linked to client instance 710, then proceeds to find the transaction instances, such as transaction instance 750, linked to those account instances, then finds the production service instances, such as production service instances 760, linked to the transaction instances, then finds the billing service instances, such as billing service instances 770, linked to the production services, then finds price (cost) table instances linked to the transaction instances, the account instances, the client instances, or department instances, then selects one or more of these retrieved price table instances to determine the actual cost of the billing service instances for servicing the client. Compound queries to retrieve specific types of information are also possible. For example, the FSC can retrieve only billing services linked to a transaction instance of a specified transaction type. Implementation of compound queries are described in U.S. Pat. No. 5,604,899.

Typically, as each billing service instance is tallied, the cost or fee for the billing service instance is retrieved from only one price table instance. Generally, if a price table instance is associated with the transaction instance containing the billing service type of the billing service instance, that price table instance is used. Then the price table instance associated with the account instance, the client instance, and the department instance are used. Finally, if none of the other price tables contain the billing service type, the global price table instance is used. Thus if a billing service instance in billing service instances 770 is being tallied, the data base system attempts to price the billing service instance by using price table instance 757. If the billing service type is not in price table instance 757, the database system uses price table instance 737, then price table instance 717, then price table instance 787, and finally the global price table instance until the price of the billing service type is located. However, FSCs may choose to use other access schemes by using compound queries to choose specific price table instances to use.

FIG. 7(c) shows one embodiment of a price table instance 790. Price table instance 790 is a table with two columns and multiple rows. First column 791 stores a billing service type in each row. Second column 792 contains the cost or fee of the billing service type in the row. Optional column 793 contains a minimum limit for the billing service type. The minimum limit is used to perform tiered pricing based on volume. For example, a billing service type may have three different entries in price table instance 790. The minimum limit for each entry and the cost or fee for each entry differs. Thus the price used for the billing service type depends on the number of billing service instances of the billing service type.

In some embodiments of the data processing system, price table instances include both costs and fees. In other embodiments, cost table instances which only contain costs and fee table instances which only contain fees are used. In some embodiments of the database system, each fee table instances must be related to a cost table instance. The presence of the cost table instance can be mandated by using mandatory properties on a relation instance relating the fee table instance to a cost table instance.

Figure 8:
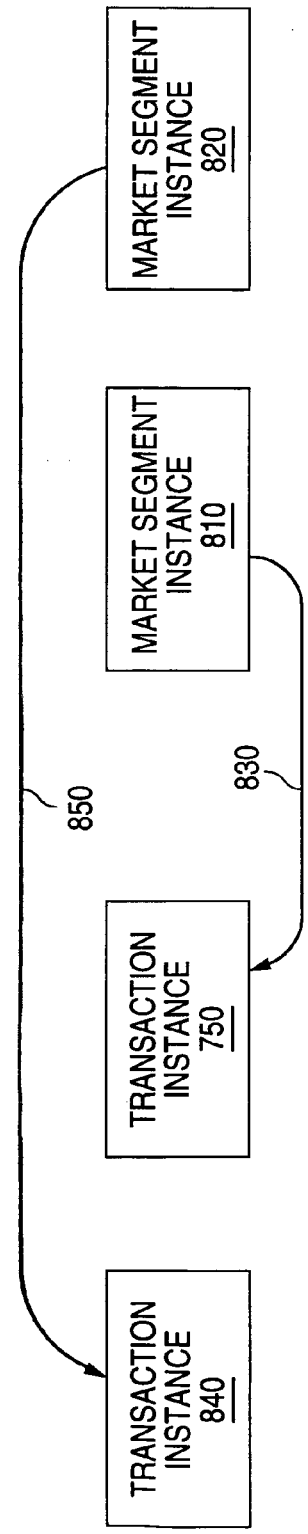
FIG. 8 illustrates management of market segments.

The FSC can also further refine queries by categorizing the transactions by other criteria such as market segments. As shown in FIG. 8, transaction instance 750 can also be mapped to a market segment instance 810 by relation instance 830 in addition to being linked to account instance 730 (FIG. 7(a)). Other market segment instances such market segment instance 820 are linked with other transaction instances such as transaction instance 840. Thus, the FSC can query the data processing systems for transactions by client 710 in market segment 810 to find transaction instance 750 and the production service instances and billing service instances of transaction instance 750.

The data processing system can be enhanced to include functions of a billing system by including settlement services. Settlement services represent methods to collect the fees for a transaction from the client. For example, different settlement service types include sending a bill to the client, offsetting interest from a client's account for the fee, and deducting the fee from a client's account. FIG. 9 illustrates the mapping rules for a billing service type 910 which is mapped to a settlement service type 920 by a relation type 930. Typically only billing service types which include a fee are mapped to settlement services. Like the mapping of production service instances to billing service instances, the mapping of billing service instances to settlement service instances can include mappings of one billing service instance to one settlement service instance, one billing service instance to multiple settlement service instances, multiple billing service instances to one settlement service instances, and multiple billing service instances to multiple settlement service instances.

During a billing cycle, typically monthly, the data processing system processes each transaction to create transaction instances, production service instances, billing service instances, and settlement service instances, as described above. At the end of the billing cycle, the FSC can query the data processing system for all of the settlement service instances of a particular client to collect the appropriate fee in the appropriate manner from the client. However the FSC must insure that the data processing system does not overcharge the client by including fees which are already settled in another manner. For example, in "deduct-fee" transactions, the FSC's fee is included in the transaction amount. For example, a FSC may charge $10 to transfer $1,000 from a client's account in Texas to an account in California. The FSC would deduct $1,010 from the account in Texas but only credit $1,000 to the account in California. These "deduct fee" transactions can be marked by using relation instances of a special "deduct fee" relation type to relate a transaction instance to production service instances, or to relate a production service instance to billing service instances, or to relate a billing service instance to settlement service instances, or by using "deduct fee", billing service types, or by using "deduct fee" settlement service types.

FIG. 10 is a flow chart which illustrates the creation of a database for a client in a data processing system in accordance with one embodiment of the present invention. The FSC must first create mapping rules for the various transaction types that clients may request. When the FSC obtains a new client, a client instance is created in create client 1010. If necessary, a price table instance related to the client instance is created in create price table 1015. In create accounts 1020, the data processing system creates account instances for the client. For each account instance, a price table instance related to the account instance can be created in creates price tables 1025 if a price table is needed for an account. When the client conducts a transaction with the FSC, the FSC enters the transaction into the data processing system which creates a transaction instance in create transaction instance 1030. If a special pricing table is needed for the transaction, the FSC can create a pricing table instance related to the transaction instance in create price tables 1035. The data processing system then follows the mapping rules to create production service instances and relation instances for the transaction in create production service 1040, as described above. Then, the data processing system creates the appropriate billing service instances and relation instances in create billing services 1050, as described above. In some embodiments, the data processing system creates settlement service instances and relation instances in create settlement services 1060, as described above. As each the client conducts more transactions, each transaction is entered into the data processing at create transaction 1030 to produce the appropriate production service instances, billing service instances, settlement service instances, and relation instances for that transaction. As explained above, the transaction may also be linked to various market segment instances or entity instances corresponding to other criteria.

Once the data processing for the client includes enough transactions, the FSC can analyze the cost incurred to maintain the client. As explained above, the FSC can use complex queries to retrieve the billing service instances used by the client and related price tables to determine the cost of maintaining the client. Once the cost is determined, the FSC can renegotiate the contract with the client so that the fees charged to the client can better reflect the cost required to support the client.

Furthermore, as explained above, the various transactions can be linked to entity instances representing various categories that the FSC may track. Thus, by using a data processing system in accordance with the present invention a FSC is able to track the costs and fees of its operations by any criteria defined by the FSC. A specific embodiment of a data processing system in accordance with the present invention for use with the database system of U.S. Pat. No. 5,604,899 is provided in Appendix A.

In the various embodiments of this invention, methods and structures have been described that eliminate the difficulties in pricing complex financial transactions. By mapping transactions into production services and billing services a FSC can track the cost of performing the services required by clients. Thus a data processing system in accordance with the present invention allows a FSC to accurately measure the profitability of the FSC as well as analyze the business of the FSC by various market segments or other categories.

The various embodiments of the structures and methods of this invention that are described above are illustrative only of the principles of this invention and are not intended to limit the scope of the invention to the particular embodiments described. In view of this disclosure, those skilled-in-the-art can define other transaction types, production service types, billing service types, price tables, data processing systems, settlement service types, mapping rules, relation types, and use these alternative features to create a method, circuit, or system according to the principles of this invention.

We claim:

1. A method for providing a database suitable for pricing transactions, the method comprising:

creating a transaction instance corresponding to a transaction;

creating a first production service instance representing an action performed to process said transaction, said first production service instance being linked to said transaction instance by a first relation instance;

creating a billing service instance representing a billing service related to a pricing of said first production service, said billing service instance being linked to said first production service instance by a second relation instance; and pricing said transaction for billing a customer based on said transaction instance, said first production service instance and said billing service instance.

2. The method of claim 1, further comprising creating a second production service instance linked to said transaction instance by said first relation instance.

3. The method of claim 1, further comprising creating a second billing service instance linked to said first production service instance by said second relation instance.

4. The method of claim 1, further comprising creating a second production service instance linked to said transaction instance by a third relation instance.

5. The method of claim 1, further comprising creating a second billing service instance linked to said first production service instance by a third relation instance.

6. The method of claim 1, further comprising creating a third relation instance linking said transaction instance to an account instance.

7. The method of claim 6, wherein said account instance is linked to a client instance by a fourth relation instance.

8. The method of claim 6, further comprising creating a fourth relation instance linking said transaction instance to an entity instance.

9. The method of claim 8, wherein said entity instance is a market segment instance.

10. The method of claim 1, further comprising storing said transaction instance, said production service instance and said billing service instance in at least one entity instance table.

11. The method of claim 10, further comprising storing said first relation instance and said second relation instance in at least one relation instance table.

12. The method of claim 1, further comprising creating a settlement service instance linked to said billing service instance by a third relation instance.

13. The method of claim 1, further comprising:

creating a price table instance related to said transaction instance;

wherein said price table instance contains a price for said billing service instance.

14. The method of claim 13, wherein said price table instance is a cost table instance and said price is a cost.

15. The method of claim 13, wherein said price table instance is a fee table instance and said price is a fee.

16. The method of claim 15 further comprising creating a cost table instance related to said fee table instance by a mandatory relation instance.

17. The method of claim 1, further comprising:
creating an entity instance related to said transaction instance; and creating a price table instance related to said entity instance;
wherein said price table instance contains & price for said billing service instance.

18. The method of claim 17, wherein said entity instance is an account instance.

19. The method of claim 1, further comprising:
creating a first entity instance related to said transaction instance;
creating a second entity instance related to said first entity instance; and creating a first price table instance related to said second entity instance;
wherein said first price table instance contains a price for said billing service instance.

20. The method of claim 19, wherein said first entity instance is an account instance and said second entity instance is a client instance.

21. The method of claim 19, further comprising creating a second price table instance related to first entity instance.

22. A database data processing system for pricing transactions, said data processing system comprising:
means for creating a transaction instance corresponding to a transaction;
means for creating a first production service instance representing an action performed to process said transaction, said first production service instance being linked to said transaction instance by a first relation instance;
means for creating a billing service instance representing a billing service related to a pricing of said first production service, said billing service instance being linked to said first production service instance by a second relation instance; and
means for computing a price for said transaction, said price being a cost to a customer for said transaction computed based on said transaction instance, said first production service instance and said billing service instance.

23. The data processing system of claim 22, further comprising means for creating a second production service instance linked to said transaction instance by said first relation instance.

24. The data processing system of claim 22, further comprising means for creating a second billing service instance linked to said first production service instance by said second relation instance.

25. The data processing system of claim 22, further comprising means for creating a second production service instance linked to said transaction instance by a third relation instance.

26. The data processing system of claim 22, further comprising means for creating a second billing service instance linked to said first production service instance by a third relation instance.

27. The data processing system of claim 22, further comprising means for creating a third relation instance linking said transaction instance to an account instance.

28. The data processing system of claim 27, wherein said account instance is linked to a client instance by a fourth relation instance.

29. The data processing system of claim 27, further comprising means for creating a third relation instance linking said transaction instance to an entity instance.

30. The data processing system of claim 22, further comprising at least one entity instance table to store said transaction instance, said production service instance and said billing service instance.

31. The data processing system of claim 30, further comprising at least one relation instance table to store said first relation instance and said second relation instance.

32. The data processing system of claim 22, further comprising means for creating a settlement service instance linked to said billing service instance by a third relation instance.

33. The data processing system of claim 22, further comprising:
means for creating a price table instance related to said transaction instance;
wherein said price table instance contains a price for said billing service instance.

34. The data processing system of claim 33, wherein said price table instance is a cost table instance and said price is a cost.

35. The data processing system of claim 33, wherein said price table instance is a fee table instance and said price is a fee.

36. The data processing system of claim 35 further comprising means for creating a cost table instance related to said fee table instance by a mandatory relation instance.

37. The data processing system of claim 22, further comprising:
means for creating an entity instance related to said transaction instance; and means for creating a price table instance related to said entity instance;
wherein said price table instance contains a price for said billing service instance.

38. The data processing system of claim 22, further comprising:
means for creating a first entity instance related to said transaction instance;
means for creating a second entity instance related to said first entity instance; and means for creating a first price table instance related to said second entity instance;
wherein said first price table instance contains a price for said billing service instance.

39. The data processing system of claim 38, wherein said first entity instance is an account instance and said second entity instance is a client instance.

40. The data processing system of claim 38, further comprising means for creating a second price table instance related to first entity instance.

* * * * *

UNITED STATES PATENT AND TRADEMARK OFFICE
CERTIFICATE OF CORRECTION

| | |
|---|---|
| PATENT NO. | : 7,127,420 B1 |
| APPLICATION NO. | : 09/535573 |
| DATED | : October 24, 2006 |
| INVENTOR(S) | : Robert A. Foster |

It is certified that error appears in the above-identified patent and that said Letters Patent is hereby corrected as shown below:

In Column 13, line 5, please delete "contains & price" and insert --contains a price--

In Column 14, line 4, in Claim 29, please delete "claim 27" and insert --claim 22--

Signed and Sealed this

Thirteenth Day of February, 2007

JON W. DUDAS
*Director of the United States Patent and Trademark Office*